Figures 1, 2:
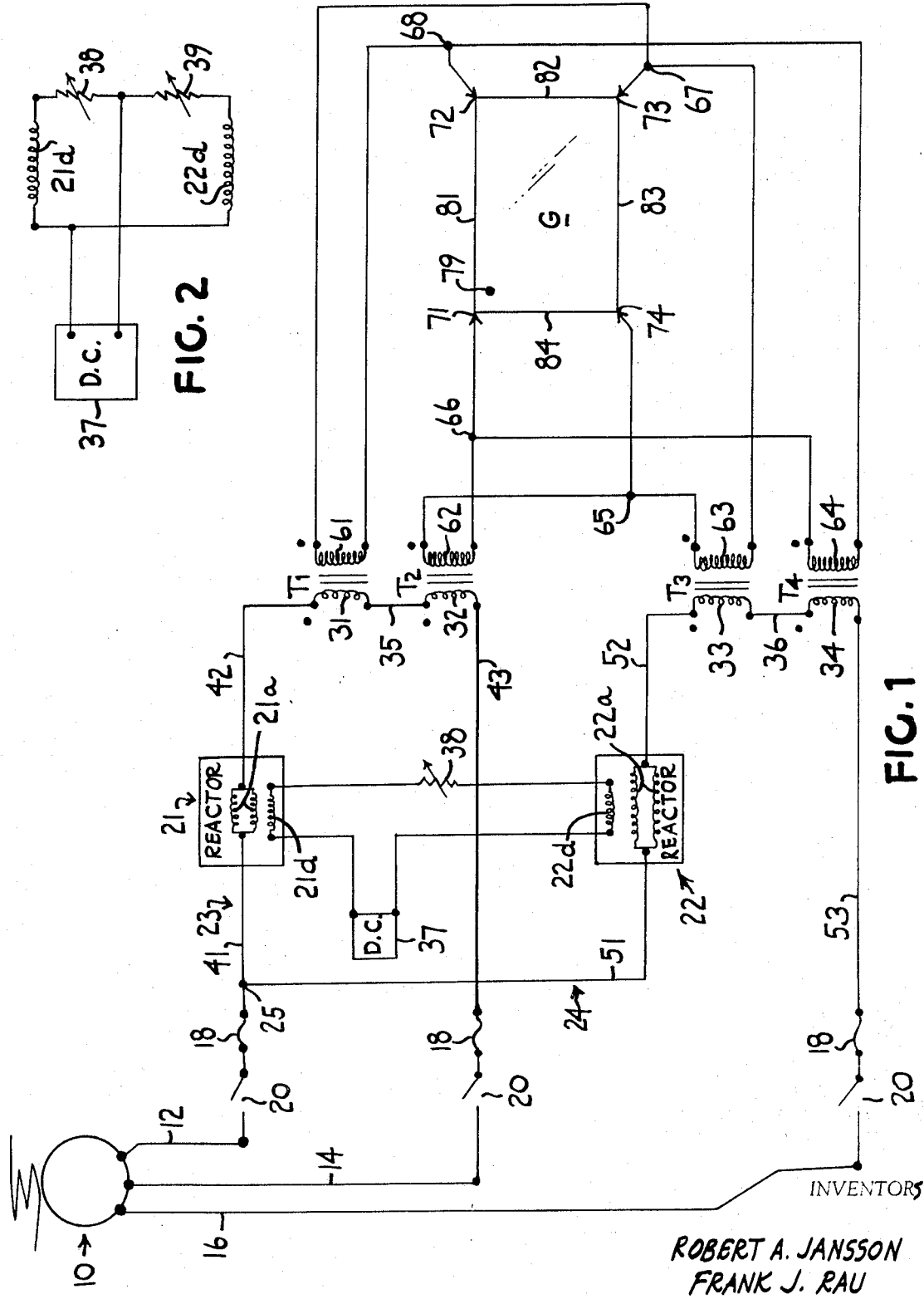

United States Patent

[11] 3,628,935

| | | |
|---|---|---|
| [72] | Inventors | Robert A. Jansson;<br>Frank J. Rau, both of Pittsburgh, Pa. |
| [21] | Appl. No. | 862,265 |
| [22] | Filed | Sept. 30, 1969 |
| [45] | Patented | Dec. 21, 1971 |
| [73] | Assignee | PPG Industries, Inc.<br>Pittsburgh, Pa. |

[54] WELDING GLASS SETS
9 Claims, 2 Drawing Figs.

[52] U.S. Cl. ................................................. 65/40,
65/58, 219/110, 219/483
[51] Int. Cl. .......................................... C03b 23/24,
B23k 11/24, H05b 3/02
[50] Field of Search ........................................... 65/36, 40,
58; 219/110, 483, 213

[56] References Cited
UNITED STATES PATENTS
2,389,360  11/1945  Guyer et al. .................. 65/58 X
3,247,361  4/1966  Woodley ..................... 219/483

Primary Examiner—S. Leon Bashore
Assistant Examiner—Saul R. Friedman
Attorney—Chisholm and Spencer ABSTRACT: Electrically working glass to fuse the marginal portion of one glass sheet to that of another glass sheet to form a double glazed unit by heating the sheets to a temperature near the strain point of glass and intensifying the heating in the marginal portion of the one sheet to make its marginal portion more electroconductive than the remainder of the sheet. The electric circuit used in the welding process has a polyphase alternating current voltage source coupled to the marginal edge portion through saturable reactors and a transformer circuit. One phase of the power source is coupled through a saturable reactor across one pair of opposite marginal edge portions and another phase is coupled through a saturable reactor across the other pair of opposite marginal edge portions. An output current is thus produced in the marginal edge portion which is approximately equal along all of the four side edges.

PATENTED DEC 21 1971  3,628,935

INVENTORS
ROBERT A. JANSSON
FRANK J. RAU
BY
Chisholm and Spencer
ATTORNEYS

WELDING GLASS SETS

This invention refers to "welding glass sheets," and particularly refers to a novel method of heating the marginal edge portion of a glass sheet electrically in order to weld it to another glass sheet to fuse two sheets together along their entire marginal edge portions while keeping the area within their marginal edge portions in spaced relation to one another to form a multiple glazing unit. A circuit useful in performing this method of the present invention includes a novel transformer arrangement coupled to a polyphase voltage source and constant current control means for the primary coils for heating the entire marginal edge portion more efficiently than the prior art to achieve the object of the present invention.

U.S. Pat. No. 2,398,360 to Edwin M. Guyer et al. discloses a method of manufacturing a double glazed window using an electroconductive stripe around the margin of each of a pair of glass sheets to be welded together along their edges. Current applied between a plurality of electrodes, preferably placed at the corners of a square-shaped unit, passes through the stripe to heat the glass sheet margin to a temperature at which the heated glass margin becomes electroconductive and the stripe burns off. The current is either supplied to all four sides of the stripe simultaneously or in a step-by-step fashion by switching the current from one pair of electrodes to another so as to apply voltage to each of the four sides of the marginal stripe in sequence and repeating this technique of sequential cycles until the glass is completely softened around its margin and susceptible to welding to the other glass sheet. U.S. Pat. No. 2,394,051 to Guyer et al. discloses a particular electrical circuit with stepping switches to control the sequential heating of each of the four sides of a unit to be welded using the step-by-step cycling method.

It is admitted in the aforesaid patents that when simultaneous heating methods are employed, it is sometimes necessary to shift the electrodes or to provide especially designed control circuits to obtain a proper current distribution. When electrodes are shifted from the corners of the unit to improve current distribution, the glass portion in closest adjacency to the electrode either bows outward or develops a hole facing the electrode. An arc that forms between each electrode and the glass is more easily directed along the length of the marginal edge portions radiating from the adjacent corner than from other points along the sides of the glass sheet being heated for welding.

In addition, when electrodes are spaced from the corners, current flow around the marginal edge portion of the glass seeks a diagonally extending shortcut bypassing any corner not directly facing an electrode. This shortening of the current path tends to round out the region of welding inward of the corner of the welded unit, leaving a protrusion at each corner of the double glazed unit that is separated from an electrode during its electrical welding. Consequently, when the electrodes are moved away from the corners of the sheet to adjust the current distribution, the quality of the resulting units leaves something to be desired.

The specially designed circuits preferred in the aforesaid Guyer et al. patents scan the margin of the sheet in step-by-step fashion by switching the current from between one pair of electrodes to another so as to cause flow between two adjacent electrodes in sequential manner for about seven cycles. Current is increased from cycle to cycle to increase the glass edge temperature in increments along each side edge in sequence until the unit is completely welded.

Control circuits of this type that have been suggested previously have drawbacks also. They require a complicated logic circuit that interrupts current flow whenever the current is switched from one side of the marginal edge portion to the next adjacent side. After switching is completed, the arc between the electrodes and the next side to be heated must be reestablished before current flows in the next side to be heated electrically. Therefore, the prior art circuits that promote step-by-step heating have a built-in time delay that slows the rate of production.

The special circuits disclosed in the prior art to provide simultaneous current flow to all four sides, even from a fairly constant voltage source, accentuate the difference in heating rates along the different edges of the glass as the current flow continues. This is because any variation that causes the electrical resistance along any one marginal side edge to differ materially from that of the remaining marginal side edges causes a greater current flow in a circuit through any relatively low resistance marginal side edge and a lesser current flow in the parallel circuits including the other marginal side edges having relatively high resistance. Since heat received is a function of the square of the current flow, the marginal side edge receiving the higher current flow becomes hotter and more electroconductive than the other edges. This unequal heating which is called "runaway heating" in the art, causes the imbalance in electroconductivity among the edges to accentuate at a geometric rate as current flow continues. This results in the softening of low resistance edges of the unit before the remaining edges are heated sufficiently for proper fusion.

One proposal to reduce the tendency of unequal edge heating to accentuate during the marginal edge heating incidental to welding involves applying the secondary current of a transformer used in a marginal edge heating circuit so as to permit it to flow alternately through one portion of the marginal edge portion of the glass sheet to be heated to welding temperature without any substantial current in the remainder of the marginal edge portion and to permit the secondary current to flow through the remainder of the marginal edge portion of the glass sheet without any substantial current in the first portion of the marginal edge portion.

In rectangular units having four side edges, this is accomplished by using a two way switching circuit in a glass margin heating circuit. The switching circuit permits current to flow alternately through one pair of opposite edges of the glass sheet with no substantial current flow in the remainder of the marginal edge when the switching circuit is gated in one direction and through the other pair of opposite edges only with no substantial current in said one pair of opposite edges when the switching circuit is gated in an opposite direction. Such systems are dependent on the continuous operation of critical relays. Whenever a relay becomes inoperative, the entire process must be stopped until the defective relay is replaced or repaired.

The present invention provides a system which does not depend upon relays for its operation, but uses a polyphase alternating current source that is coupled through a pair of parallel input branches, each including a current control device, and electrodes to the stripe of electroconductive material that is initially placed along the marginal edge portion of the glass sheet to control the rate of current flow between adjacent electrodes, first through the electroconductive material that readily dissipates completely after the glass is heated to a temperature sufficient to become electroconductive, and then through the electroconductive marginal edge portion established in the glass sheet by the selective marginal heating due to said initial current flow.

The present invention provides a circuit that has several self-regulation features that minimize runaway heating of one or more side edges at the expense of heating the remainder of the glass perimeter. These features are shown in the illustrative embodiments, and described below.

In an illustrative embodiment of the invention, a polyphase input voltage is applied through parallel input branches of a simple saturable reactor circuit to provide a constant input current to the primary coils of four step-up transformers arranged in a series-parallel arrangement comprising a pair of series-connected primary coils for each parallel input branch. The output currents flowing in the secondary transformer circuits simultaneously pass at two phases, one phase for the output coupled to one input branch passing through one pair of opposite circuits extending along one pair of opposite side edges of the marginal edge portion, while current at the other phase for the output coupled to the other input branch is supplied along the other pair of opposite edges of the marginal edge portion.

The secondary coils are connected to electrodes that supply current to the marginal edge portions of the glass in such a manner that the polarity at opposite pairs of corners are opposing. This polarity arrangement avoids the establishment of circulatory currents around the marginal edge of the treated sheet.

Currents passing simultaneously through the different pairs of opposite edges at different phases, particularly those available commercially at a phase difference of 120°, produce resultant currents resulting from interaction between the currents provided along one pair of opposite edges and the currents provided along the other pair of opposite side edges that are smaller than the larger of the phased currents. This characteristic further reduces any tendency to produce circulating currents.

Series connecting the primary coils for each input branch controlling current to an opposite pair of side edges provides an additional self-regulation feature that opposes any tendency for the heat buildup in one side edge to accelerate. Of course, the constant current control devices ensure a constant value for the input current for all the primary coils. This latter feature facilitates control of the output currents applied along opposite pairs of side edges.

Each of the individual characteristics enumerated above provides an improvement over the prior art. The combination of these self-regulating features provides even more positive control of the operation than any one feature alone.

The present invention makes it possible to use readily obtainable polyphase commercial power at a readily available commercial frequency. There is no need to lead or lag one of the phases to change the phase difference of the available polyphase power. Motor generator sets that are commercially available may be purchased to provide higher frequencies for the polyphase voltage source in the manner suggested by the present invention if higher frequencies are desired to weld glass sheets together at their marginal portions to form multiple glazed units.

A detailed description of a typical example of a circuit useful for performing the present invention and a modification of an element thereof will be described in order to facilitate understanding of the present invention.

In the drawings, which form part of the description of an illustrative embodiment.

FIG. 1 is a schematic diagram of an electric circuit used to heat the entire marginal edge portion of a glass sheet, which circuit comprises a polyphase voltage source and a plurality of transformers according to the present invention, and FIG. 2 is a fragmentary circuit drawing of an alternate embodiment of control device employing a parallel rather than a series circuit for a constant current control device.

The circuit illustrated in FIG. 1 comprises a polyphase voltage source 10, preferably a three-phase AC voltage source of 480 volts feeding three lines 12, 14 and 16 at phase differences of 120°. Each line is suitably protected by a fuse 18 and switch 20. The circuit also comprises constant current control means including a pair of constant current control devices, such as simple saturable reactors 21 and 22, having corresponding alternating current coils 21a and 22a and single direct current coils 21d and 22d, respectively. The simple saturable reactors 21 and 22 provide a constant output current dependent upon the direct current applied to the control coils 21d and 22d. The AC coils 21a and 22a of the reactors 21 and 22 are connected in parallel input branches 23 and 24, respectively. The input branches are electrically connnected to line 12 at a branch connection 25.

Typical suitable saturable core reactors are available commercially under the trade name of Sorgel Saturable Core Reactor and comprises parallel coils that transmit alternating current and another coil connectable to a direct current voltage source through a variable resistance. In each reactor, the amount of current passing through its coil connected to the direct current voltage source controls the alternating current through its coils that transmits alternating current.

These saturable core reactors represent one type of relatively inexpensive constant current control devices that operate over a wide range of input alternating voltages, alternating frequencies of the input alternating voltage and load resistances. The output alternating current depends on the input direct current according to the following relation:

$I_A \approx (2N_D/N_A)I_D$, where $I_A$ is the input alternating current
$N_D$ is the number of turns in the DC coil
$N_A$ is the number of turns in each AC coil and
$I_D$ is the direct current applied to the DC coils.

The circuit also comprises transformers T1, T2, T3 and T4. Transformers T1 and T2 have primary windings 31 and 32, respectively, connected into input branch 23 in series with a parallel circuit containing the alternating current carrying coils 21a of reactor 21, while transformers T3 and T4 have primary windings 33 and 34, respectively, series connected into input branch 24 in series with a parallel circuit containing the alternating current carrying coils 22a of reactor 22. Branch 23 includes a connecting wire 35 that connects the primary windings 31 and 32 in series, while branch 24 includes a connecting wire 36 that connects the primary windings 33 and 34 in series.

A common DC voltage source 37 is provided for the direct current carrying coils 21d and 22d, respectively, of the saturable core reactors 21 and 22 constituting the current control devices through a reactor circuit comprising a variable resistor 38 in series with the coils 21d and 22d. The variable resistor 38 serves as means for adjusting the current control devices 21 and 22. As an alternative, the reactor circuit can be designed as in FIG. 2 to comprise two parallel reactor branches. In the alternative reactor circuit, one of the reactor branches for the direct current coil 21d for reactor or constant current control device 21 includes variable resistor 38 which serves as means for adjusting the current control device 21 to control the current in branch 23, whereas the other reactor branch for the direct current carrying coil 22d for saturable core reactor or constant current control device 22 includes a variable resistor 39, which serves as means for adjusting the current control device 22 to control the current in input branch 24 independently of the control over the current in input branch 23.

Branch 23 also includes a wire 41 connecting the branch connection 25 to one end of the branched circuit containing the alternating current carrying coils 21a of the saturable core reactor 21, a wire 42 connecting the other end of said circuit containing said coils 21a to primary coil 31 and another wire 43 connecting primary coil 32 to line 14 from the polyphase power source 10. Thus, input branch 23 forms a circuit through the wire 41, the parallel coils 21a of saturable coil reactor 21, wire 42, primary coil 31, connecting wire 35, primary coil 32 and wire 43 from line 12 to line 14.

Parallel input branch 24 provides a similar circuit between lines 12 and 16. From branch connection 25, a wire 51 connects to one end of the parallel circuit containing the alternating current carrying coils 22a of the saturable reactor 22, another wire 52 connects the other end of said parallel circuit for said latter coils 22a to primary coil 33 and still another wire 53 connects primary coil 34 to line 16. Thus, the circuit of parallel input branch 24 includes wire 51, coils 22a of reactor 22, wire 52, primary transformer coil 33, connecting wire 36, primary transformer coil 34 and wire 53 connected from line 12 to line 16.

Each of the transformers T1, T2, T3 and T4 has a secondary coil 61, 62, 63 and 64, respectively. The secondary coils are interconnected with due respect given to the polarity of each coil. If the dotted end of each transformer coil represents a given polarity, it will be easy to follow the respective connections to the four corners of a rectangular glass sheet to be welded in such a manner as to minimize circulatory currents in favor of parallel currents across opposite edges. Thus, the polar ends of coils 62 and 63 are connected at 65, connection 66 connects the nonpolar end of coil 62 to the polar end of coil 64, connection 67 connects the polar end of coil 61 to the nonpolar end of coil 63 and connection 68 interconnects the nonpolar ends of coils 61 and 64.

A series of electrodes 71, 72, 73 and 74 are disposed in close adjacency to the four corners of a supported glass sheet G so that the electrodes are adjacent the four corners of the upper sheet of a pair of glass sheets of rectangular outline slated to be joined together at their marginal periphery. Electrode 71 is connected to connection 66, electrode 72 to connection 68, electrode 73 to connection 67 and electrode 74 to connection 65 to ensure that there is a maximum of parallel current flow along opposite pairs of edges and a minimum of circulatory current flow around the perimeter of the glass sheet when power is applied to the glass sheet marginal edge portion. The glass sheet G is also apertured at 79 in a manner well known in the art to permit the unit to be "purged" or filled with a desired gas at a desired pressure after the welding is completed.

The four sides of the glass sheet G to be heated along its marginal portion are initially coated with electroconductive stripes of a readily dissipated graphitic dispersion along its marginal edges 81, 82, 83 and 84. This dispersion provides a series of electroconductive paths between adjacent electrodes, the stripe along edge 81 extending from the corner adjacent electrode 71 to the corner adjacent electrode 72, the stripe along edge 82 from the corner adjacent electrode 72 to the corner adjacent electrode 73, the stripe along edge 83 from the corner adjacent electrode 73 to the corner adjacent electrode 74 and the stripe along edge 84 from the corner adjacent electrode 74 to the corner adjacent electrode 71.

The secondary coils are coupled to adjacent electrodes in the following manner. The terminals of secondary coil 61 are connected to electrodes 72 and 73, while the terminals of secondary coil 62 are connected to electrodes 71 and 74. Thus, the secondary coils of transformers T1 and T2, which are coupled to the voltage output between lines 12 and 14 applied at one phase through branch 23 control the current flow along the conductive edges 82 and 84 disposed along the pair of shorter opposite edges of the glass sheet G when a welding operation is begun. In addition, the secondary coil 63 of transformer T3 has its terminals connected to electrodes 73 and 74 and the terminals of secondary coil 64 of transformer T4 are connected to electrodes 71 and 72. Therefore, the secondary coils of transformers T3 and T4, which are coupled to the voltage output between lines 12 and 16, control the current flow along the other pair of opposite conductive edges 81 and 83 when the welding operation is begun.

The arrangement of the welding circuit is such that all four side edges of the glass sheet are simultaneously subjected to current flow responsive to the voltage difference between the terminals of the respective secondary transformer coils connected to adjacent electrodes. However, since the phase of the secondary current output from the secondary transformer coils 61 and 62 of transformers T1 and T2 is based on the phase of the voltage between lines 12 and 14 impressed on the primary coils 31 and 32, the current flow in the opposite pair of electroconductive edges 82 and 84 are in phase with one another. Similarly, since the primary transformer coils 33 and 34 of transformers T3 and T4 are connected to lines 12 and 16, the output current from secondary coils 63 and 64 to the opposite pair of electroconductive edges 83 and 81, respectively, are in phase with one another and out of phase with the current flow in the electroconductive edges 82 and 84.

By proper attention to the polarity of the various transformer coils, the polar sides of coils 61 and 62 that control current flow along edges 82 and 84 are connected to corresponding flow along edges 82 and 84 are connected to corresponding corners through electrodes 73 and 74 to cause parallel current flow in the same directions along edges 82 and 84 at one phase of output current. Similarly, by connecting the polar ends of coils 63 and 64 to corresponding corners near electrodes 74 and 71, parallel current flow is maintained in the same direction along edges 81 and 83 at another phase of output current.

The polyphase voltage source 10 is thus able to produce an output current simultaneously in all four sides of the marginal edge portion of the glass sheet G through the electrodes 71, 72, 73 and 74 in such a manner that there is substantially no rotary current resulting from interaction between the output current produced across one pair of opposite edge portions of the glass sheet G and that produced across the other pair of opposite edge portions.

As the current passes through the electroconductive edges 81 and 83 at one phase and through the electroconductive edges 82 and 84 at another phase, the phase difference of 120° between currents flowing along adjacent edges causes any resultant current due to interaction between the currents flowing at a phase differential from one another to be less than the larger of the currents flowing in either pair of opposite edges. Whenever, for any reason, such as applying a thicker graphite stripe along one edge or heating the sheet nonuniformly so that one edge is hotter than another, one edge becomes more conductive than another, the series connection between primary coils affecting the current flow across opposite pairs of side edges, the maintenance of phase difference between current flows along adjacent edges due to how the edges are coupled to the polyphase voltage source and the constant current control devices for the primary coil circuits combine to provide a self-regulating mechanism in the following manner.

Assume edge 82 is the edge that becomes hotter than the others. Its voltage is controlled by secondary coil 61. When the electrical resistance across edge 82 drops because of its higher temperature, voltage and power decrease across secondary coil 61. However, the constant current flowing through the series circuit containing primary coils 31 and 32 develops the same output current through the secondary coils 61 and 62 as existed with the higher resistance along edge 82. Hence, current flowing along edge 82 does not differ from that flowing along edge 84, but power applied to edge 82 is reduced compared to that applied along edge 84 until the resistances of the opposite edges 82 and 84 again become equal. The 120° phase difference between the current flow in side 82 and those of the parallel flows in adjacent sides 81 and 83 minimizes any effect in the current flow in adjacent sides 81 and 83 in response to a temporary unbalanced increase in current flow in side 82 due to unequal heating. Connecting the secondary coils to the electrodes with proper caution for polarity results in minimizing any tendency to produce a circulatory that may be established if polarity were ignored.

A typical operation to produce a square multiple glazing unit of 0.090-inch thick sheet glass having a length 14 inches on edge comprised mounting two glass sheets over one another with the slightly larger sheet on top having all four sides extending slightly beyond the four sides of the marginal edge of the lower sheet and applying a readily dissipated electroconductive coating about one-fourth inch wide having a resistance of about 7,000 ohms per inch of length along the entire peripheral portion of the overhanging margin of the upper sheet. An alternating polyphase voltage was provided through a circuit of the type illustrated in FIG. 1, comprising a step-up transformer initially set to provide an output voltage of 10,000 volts. The polyphase voltage was started after preheating the two sheets to a temperature of between 800° F. and 950° F. The secondary of each of the four transformers was set for the same amplification.

During the electrical heating operation, the two sheets of slightly different size were aligned one over the other in facing relation with the upper sheet one-fourth inch larger along each dimension to provide an one-eighth inch wide overhang extending completely around the peripheral portion of the upper sheet and containing the one-fourth inch wide electroconductive stripe along its marginal edge. As this margin softened, a vacuum platen supporting the upper sheet lifted the upper sheet slightly to enable the margin of the upper sheet to droop and weld to the margin of the lower sheet. The stripe burned off, leaving the margin more electroconductive than the remainder of the sheet to facilitate marginal edge welding. As the glass margin became electroconductive, the operator adjusted the input polyphase voltage to maintain a desired color in the glass margin. The constant current device automatically controlled the output currents in all four sides to maintain rapid and equal heating of all four sides. The only adjustment needed was a variation in the variable resistor 38 that determined the DC voltage that controlled the constant current output for the reactors 21 and 22.

The time of welding was compared to that of a commercial operation using the sequential welding technique depicted in the Guyer et al. patents recited hereinabove for heating one side edge at a time. Approximately 31 percent less time was required for marginal heating and welding utilizing the circuit described herein to heat two opposite sides in pairs from different phases of a polyphase source than by using the sequential heating operation (step-by-step method) depicted in the previous patents.

The use of simultaneous flow through the opposed, spaced sides of the marginal edge portion to weld the glass sheet marginal edge portions together was difficult to obtain uniformly using the sequential method or the simultaneous method suggested by the Guyer et al. patents. Once one of the sides heated more rapidly than the other sides, it became more electroconductive and caused the heated side to increase its rate of heating with an accelerating difference in heating rates, because the glass electroconductivity increases rapidly with increasing glass temperature. Applying the flow of current in opposite spared pairs of marginal edges portions from different phases of a polyphase power source connected according to the teachings of the present invention through constant current control devices in the primary coil circuits reduced this effect. Heating about the marginal edge was more uniform from side to side using the presently suggested technique.

The reason for the accelerated rate of edge heating and welding compared to the prior art step-by-step operation is believed to be due primarily to the complete elimination of switching steps required for the prior art heating cycles to complete the operation. Each switching step caused a relatively large time gap in the current flow and a need to reestablish an arc every time current flow was reestablished in the step-by-step system of the prior art. Seven complete cycles required 27 time gaps for changing the load in the heating circuits using the Guyer et al. step-by-step method and 13 time gaps to change the load in the heating circuit using the technique of alternately energizing opposite pairs of side edges.

The circuit depicted in FIG. 1 was also used to weld the marginal portions of rectangular sheets together. Rectangles twice as long as their width were produced (24 inches long by 12 inches wide) by using the technique described above for welding square units. By using long, narrow rectangles (for example 61 inches by 16 inches), the secondary coils of the transformers coupled to the longer sides are tapped to provide an output voltage bearing an approximate ratio of 61 to 16 compared to the output voltage for the shorter sides. The FIG. 2 circuit is used with the constant current control devices 38 and 39 preset to compensate for the difference in output voltages applied across the opposite pair of long side edges and across the opposite pair of short side edges. Again, a reduction of about 31 percent in welding time resulted. There was no runaway heating experienced for any side during this operation at 31 percent decrease in welding time compared to prior conventional welding operations.

It is also a simple matter to lead or lag the current flow to one or the opposite pairs of sides so that any desired phase difference may be established between adjacent side edges of the sheet to be welded. However, experience has demonstrated that a 120° phase difference obtained from commercially obtained three phase power sources provides adequate performance without the need for phase changing equipment.

What is claimed is:

1. In a method of heating the marginal edge portion of a rectangular sheet of glass to a temperature sufficient to fuse its marginal edge portion to the marginal edge portion of another glass sheet by heating said sheet to a temperature near the strain point of the glass, intensifying the heat in the marginal edge portion of said sheet to make said marginal edge portion more electroconductive than the remainder of the sheet and passing electrical current through said marginal edge portion until the sides comprising said marginal edge portion reach a temperature desired for fusion substantially simultaneously, the improvement comprising coupling a polyphase alternating current voltage source to said marginal edge portion through constant current control means and a transformer circuit with one phase of said polyphase power source coupled through a constant current control device across one pair of opposite marginal edge portions of said rectangular glass sheet and another phase of said polyphase power source coupled through a constant current control device across the other pair of opposite marginal edge portions of said rectangular glass sheet to produce an output current in said marginal edge portion that is approximately equal along all of the four side edges of said marginal portion.

2. The improvement as in claim 1, wherein the output current produced across said one pair of opposite marginal edge portions and that produced across said other pair of opposite marginal edge portions are produced as the output of secondary coils of transformers in said transformer circuit whose primary coils are coupled to constant current sources.

3. The improvement as in claim 2, wherein said transformers are arranged in two pairs, one pair of said transformers receiving power at one phase of said polyphase power source and the other pair receiving power at the other phase of said polyphase power source, applying the output of one of the secondary coils of said one pair of transformers across one edge of one of said pairs of marginal edge portions, and the output of the other of said secondary coils of said one pair of transformers across the opposite edge of said one of said pairs of marginal edge portions at one phase, and simultaneously applying the output of one of the secondary coils of the other pair of said transformers across one edge of the other of said pairs of marginal edge portions and the output of the other secondary coil of the other pair of said transformers across the other edge of said other of said pairs of marginal edge portions at said other phase.

4. The improvement as in claim 3, including applying input current in series through the primary coils of said one pair of said transformers in one circuit path, and applying input current in series through said other pair of said transformers in a circuit path parallel to said one circuit path.

5. The improvement as in claim 1, wherein the marginal edge portion of said rectangular sheet has a pair of relatively long sides and a pair of relatively short sides, including arranging said transformers to step up the output voltages initially applied across said opposite pairs of marginal edge portions in approximate ratio to the length of the four edges across which said output voltages are applied.

6. The improvement as in claim 1, including the step of applying a readily dissipated stripe of electroconductive material along the entire marginal portion of said sheet to help initiate said heat intensification in said marginal edge portion.

7. An electric circuit for use in welding the marginal edge portion of a rectangular glass sheet to that of another glass sheet comprising four electrodes, one adjacent each corner of said marginal edge portion, a polyphase power source, a pair of input parallel branches coupled to said power source, one branch of said pair coupled to one phase of said power source and the other branch of said pair coupled to another phase of said power source, a current control device in each branch, four transformers including a first pair of transformers having their primary coils connected in series in one of said parallel branches and a second pair of transformers having their primary coils connected in series in the other of said parallel branches, means for adjusting said current control devices to supply equal current to each of said pair of said branches, one pair of adjacent of said four electrodes being connected across the secondary of one of said first pair of transformers, the other pair of adjacent of said four electrodes being connected across the secondary of the other of said first pair of transformers, one of said electrodes of said one pair of electrodes and one of said other pair of electrodes being connected across the secondary one of said second pair of transformers and the other of said one pair of electrodes and the other of said other pair of electrodes being connected across the secondary of the other of said second pair of transformers.

8. An electric circuit as in claim 7, wherein said rectangular sheet has a pair of long sides intermediate said pairs of adjacent electrodes and a pair of short sides intermediate said electrodes of said different pairs and said secondary coils of said one pair of transformers are tapped to provide a voltage output approximately proportional to the voltage output of said other pair of transformers in the relation of the relative length of the sides of the rectangular glass sheets between said connected adjacent electrodes.

9. An electric circuit as in claim 7, wherein means is provided for adjusting said current control device in each branch individually to control the current flow in each of said parallel input branches.

* * * * *